(12) United States Patent
Guenther et al.

(10) Patent No.: US 8,584,523 B2
(45) Date of Patent: Nov. 19, 2013

(54) SENSOR DEVICE AND METHOD FOR MANUFACTURING A SENSOR DEVICE

(75) Inventors: Sebastian Guenther, Tuebingen (DE); Rolf Kaack, Reutlingen (DE)

(73) Assignee: Robert Bosch GmbH, Stuutgart (DE)

( * ) Notice: Subject to any disclaimer, the term of this patent is extended or adjusted under 35 U.S.C. 154(b) by 393 days.

(21) Appl. No.: 12/693,880

(22) Filed: Jan. 26, 2010

(65) Prior Publication Data

US 2010/0186508 A1    Jul. 29, 2010

(30) Foreign Application Priority Data

Jan. 26, 2009  (DE) ......................... 10 2009 000 407

(51) Int. Cl.
*G01C 19/56* (2012.01)
*H01L 21/50* (2006.01)

(52) U.S. Cl.
USPC ...................................... 73/504.14; 29/592.1

(58) Field of Classification Search
USPC ...................................... 73/504.14; 29/592.1
See application file for complete search history.

(56) References Cited

U.S. PATENT DOCUMENTS

2004/0129077 A1*   7/2004   Franz et al. ............... 73/514.14

* cited by examiner

*Primary Examiner* — Hezron E Williams
*Assistant Examiner* — Gregory J Redmann
(74) *Attorney, Agent, or Firm* — Kenyon & Kenyon LLP

(57) ABSTRACT

A sensor device includes a base plate, a seismic mass having an upper side and a lower side that is situated such that given acceleration of the base plate the seismic mass is capable of being displaced in a direction oriented non-parallel to the upper side and/or to the lower side, at least one raised stop on the seismic mass, and a detection and evaluation device that is adapted to acquire a displacement movement of the seismic mass relative to the base plate and, taking into account the displacement movement, to determine an item of information relating to an acceleration of the sensor device and/or to a force acting on the sensor device, the seismic mass having at least one resilient area that includes the at least one stop and at least one displaceable remaining area, and the resilient area being connected to the remaining area via at least one spring. A method is for manufacturing a sensor device.

8 Claims, 6 Drawing Sheets

SENSOR DEVICE AND METHOD FOR MANUFACTURING A SENSOR DEVICE

CROSS-REFERENCE TO RELATED APPLICATION

The present application claims priority to Application No. 10 2009 000 407.6, filed in the Federal Republic of Germany on Jan. 26, 2009, which is expressly incorporated herein in its entirety by reference thereto.

FIELD OF THE INVENTION

The present invention relates to a sensor device and to a method for manufacturing such a sensor device.

BACKGROUND INFORMATION

In order to determine a rotational acceleration and/or a linear acceleration acting on a movable body, an inertial sensor is often attached to the movable body.

FIGS. 1A and 1B show a cross-section and a top view representing a conventional inertial sensor.

The schematically shown inertial sensor, as acceleration sensor 10, is fashioned in order to determine a linear acceleration, oriented in a direction 12 perpendicular to a substrate 14, of acceleration sensor 10, and to define a quantity corresponding to the acceleration. Substrate 14 forms, together with a frame part 16 and a capping wafer 18, a housing of acceleration sensor 10 enclosing an inner volume 20. Capping wafer 18 is fastened to frame part 16 via a sealing glass layer 22. Remaining areas of an insulating layer 24 and of a metallic and/or semiconductor layer 26 are situated between substrate 14 and frame part 16.

A seismic mass 28 of acceleration sensor 10 is situated in inner volume 20. FIG. 1B shows a top view of a lower side 30 of seismic mass 28. Seismic mass 28, connected to an anchor 34 via four flexible springs 32, is fashioned as an anti-symmetrical rocker that is capable of rotation relative to the housing of acceleration sensor 10 about an axis of rotation 36. Seismic mass 28 has a mass distribution that is anti-symmetrical relative to axis of rotation 36. The bending rigidity of flexible springs 32 is designed such that the linear acceleration of acceleration sensor 10 in direction 12 causes a movement of seismic mass 28 out of its initial position and relative to the housing of acceleration sensor 10 about axis of rotation 36.

In order to determine the movement of seismic mass 28 out of its initial position about axis of rotation 36, acceleration sensor 10 has detection electrodes 38a and 38b that are situated adjacent to lower side 30, in stationary fashion, opposite the housing made up of components 14 through 18. Detection electrodes 38a and 38b are electrically insulated from substrate 14 via partial areas of insulating layer 24.

If acceleration sensor 10 experiences an acceleration in direction 12, then the average distances d1 and d2 between lower side 30 and detection electrodes 38a and 38b change due to the anti-symmetrical mass distribution of seismic mass 28 relative to axis of rotation 36. The capacitances of a first capacitor, formed from detection electrode 38a and a partial surface of lower side 30, and of a second capacitor, formed from second detection electrode 38b and a further partial surface of lower side 30, change corresponding to the changes in average distances d1 and d2. In this manner, a magnitude of the acceleration in direction 12 can be determined via an evaluation of the capacitances of the capacitors. Because certain methods for evaluating the capacitances of the capacitors of acceleration sensor 10 are conventional, they are not described in more detail here.

In order to provide a reliable determination of a position of seismic mass 28 relative to the housing of acceleration sensor 10, it is advantageous to keep average distances d1 and d2 as small as possible. However, this creates the risk that when there is a significant acceleration in direction 12, areas of seismic masses 28 will strike against the housing of acceleration sensor 10. In order to prevent a large-surface contact between seismic mass 28 and the housing of acceleration sensor 10 given a collision with seismic mass 28, raised stops 40 are fashioned on lower side 30. In addition, stop electrodes 42a and 42b are fastened to substrate 14 that are electrically insulated from substrate 14 by remaining areas of insulating layer 24. The contact between seismic mass 28 and the housing of acceleration sensor 10 is thus limited to a contact between a stop 40a or 40b and a stop electrode 42a or 42b.

However, it is possible that, due to a mechanical overload, stop 40a or 40b will strike against a stop electrode 42a or 42b so strongly that stop 40a or 40b remains suspended from stop electrode 42a or 42b. This is referred to as stiction of stop 40a or 40b on stop electrode 42a or 42b. In addition, given a strong overload, at least a partial area of stop 40a or 40b can break away from seismic mass 28, which is often referred to as particle formation upon an impact of stop 40a or 40b against stop electrode 42a or 42b. It is desirable to have available a possibility by which stiction and/or particle formation can be prevented in a sensor device of this general type.

SUMMARY

According to example embodiments of the present invention, via the resilient construction of the at least one raised stop relative to the displaceable remaining area of the seismic mass, the kinetic energy released upon collision with the at least one stop can be converted into bending energy for a reversible bending of the at least one spring. In this manner, the kinetic energy released in the case of overload can be reduced far enough that a stiction of the seismic mass and/or a particle formation can be prevented. A suitable resilient construction of the at least one stop is ensured if the resilient area having the at least one stop is connected to the remaining area via the at least one spring. For example, the one stop is fashioned as a resilient area.

The at least one stop that connects the resilient area to the remaining area is not to be understood as being a flexible spring via which the seismic mass is connected at least to the base plate. While the at least one flexible spring is deformed when there is a displacement movement of the seismic mass, the at least one spring is carried along with the remaining area and with the resilient area in a manner corresponding to the displacement movement of the seismic mass without experiencing a deformation, as long as the stop does not strike against the base plate or a subunit of the housing.

The seismic mass having the upper side and lower side should be understood as a seismic mass in which a height between the upper side and the lower side is significantly smaller than a maximum extension of the upper side and the lower side. The seismic mass can also be referred to as a planarly formed seismic mass. The shape of the seismic mass corresponds for example to a disk or to a flat cuboid.

The at least one resilient area and the at least one displaceable remaining area are situated on the base plate such that they are displaceable when the base plate is accelerated in the direction not parallel to the upper side and/or the lower side.

However, the displacement movement of the at least one resilient area having the at least one stop need not correspond to the displacement movement of the at least one displaceable remaining area.

The acceleration acting on the base plate can be a linear acceleration and/or a rotational acceleration. The acceleration can also be a torque by which a body is held in a uniform rotational movement. The base plate can be accelerated linearly and/or radially. The initial position of the upper side and/or of the lower side of the seismic mass may be understood as a rest position and/or a position of a relative movement in which the seismic mass is displaced relative to the base plate, for example in order to determine a Coriolis force.

The item of information relating to the acceleration, which can be determined using example embodiments of the present invention, can for example be a magnitude of a linear acceleration, a rotational speed, and/or a rate of rotation. A centrifugal force or a centripetal force may also be defined as an item of information relating to the acceleration.

Example embodiments of the present invention also include the implementation of resilient stops in a seismic mass of an inertial sensor designed for the detection of a displacement movement of the seismic mass perpendicular to its substrate plane. Here, the stops are connected to the at least one displaceable remaining area of the seismic mass via a spring structure. The spring structure is capable of absorbing the energy upon overload and subsequently releasing it again, preventing a stiction or particle formation. This is advantageous in particular in a sensor device in which the seismic mass is connected to the base plate via at least one comparatively soft flexible spring, as in a low-g sensor.

In example embodiments, the seismic mass is capable of rotation relative to the base plate about an axis of rotation. Example embodiments of the present invention are thus also applicable to a sensor device in which the seismic mass is rotated about the axis of rotation through an acceleration of the base plate or through a force acting on the base plate. As an alternative, the seismic mass can also be situated on the base plate such that the seismic mass is capable of being displaced in a linear movement relative to the base plate. For example, the linear movement of the seismic mass is directed perpendicular to a substrate oriented as a base plate, which can be a subunit of a housing.

In example embodiments, the seismic mass is arranged as a rocker having a mass distribution that is anti-symmetrical relative to the axis of rotation. Such a seismic mass is well-suited to work together with the detection and evaluation device in order to determine linear accelerations.

In particular, the at least one spring via which the at least one stop is connected to the seismic mass can be U-shaped, V-shaped, linear, and/or meander-shaped. A U-shaped, V-shaped, and/or meander-shaped spring can have a relatively long length with a comparatively small diameter of the volume occupied by the spring. In this manner, a kinetic energy that is converted into bending energy upon impact against the at least one stop can be distributed over a comparatively large overall length of the spring. In this manner, a permanent bending or breaking of the spring can be reliably prevented. In addition, a linear spring is easy to manufacture.

In particular, the at least one stop can be connected to the seismic mass via at least two springs that are configured symmetrically to an axis of symmetry that extends parallel to the upper side and/or to the lower side. The symmetrical configuration of the at least two springs ensures a uniform distribution of the kinetic energy, converted into bending energy, to the at least two springs.

In example embodiments, at least two raised stops are situated on an outer surface, situated on the upper side or on the lower side of the seismic mass, of the resilient area. In this manner, a plurality of stops can be made resilient using the at least one spring.

The sensor device can be an acceleration sensor. In particular, in a low-g sensor, it is ensured that, due to the reduced risk of stiction, the seismic mass can be connected to the base plate or to a subunit of the housing via at least one flexible spring having a comparatively low reset force.

As an alternative, the sensor device can be a rotational rate sensor. Because the at least one flexible spring of a rotational rate sensor has to ensure that the seismic mass can be displaced both in a relative movement and also in an additional displacement movement, it is advantageous if the flexible spring has a low reset force.

The advantages described above are also provided in a corresponding method for manufacturing a sensor device.

In example embodiments, the manufacturing method can include the following: formation of a layer sequence made up of a substrate, an insulating layer that at least partly covers the substrate, a semiconductor and/or metallic layer that at least partly covers the insulating layer, and a micromechanical functional layer that at least partly covers the semiconductor and/or metallic layer; structuring out of at least one electrode as a subunit of the detection and evaluation device from the semiconductor and/or metallic layer; and structuring out at least of the seismic mass, the at least one stop, and the at least one spring from the micromechanical functional layer. The sensor device can thus be manufactured easily using comparatively few operating steps. In particular, the springs can be manufactured simultaneously with the bending springs. The resilient construction of the stops thus does not involve additional working steps.

Further features and aspects of example embodiments of the present invention are described in more detail below with reference to the appended Figures.

DETAILED DESCRIPTION

Figure 1A:
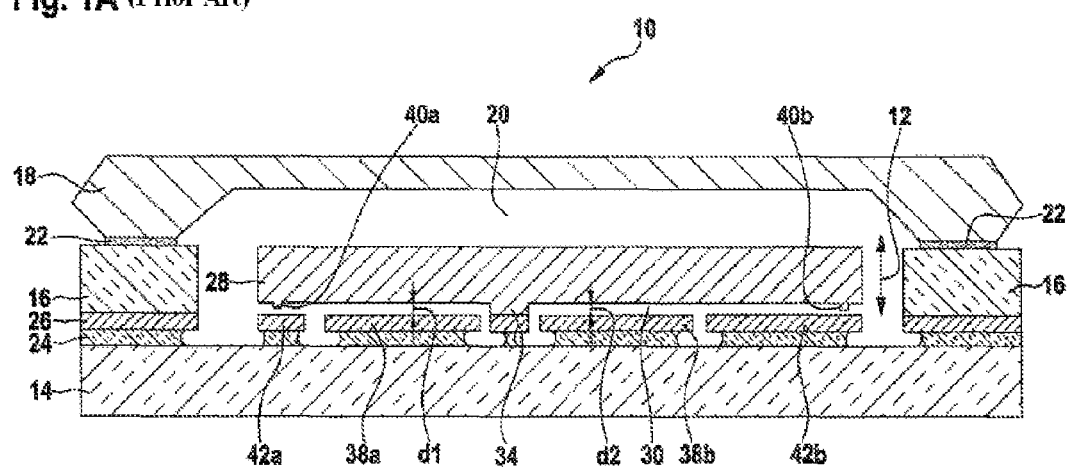
FIGS. 1A and 1B show a cross-sectional view and a top view representing a conventional inertial sensor.
Figure 1B:
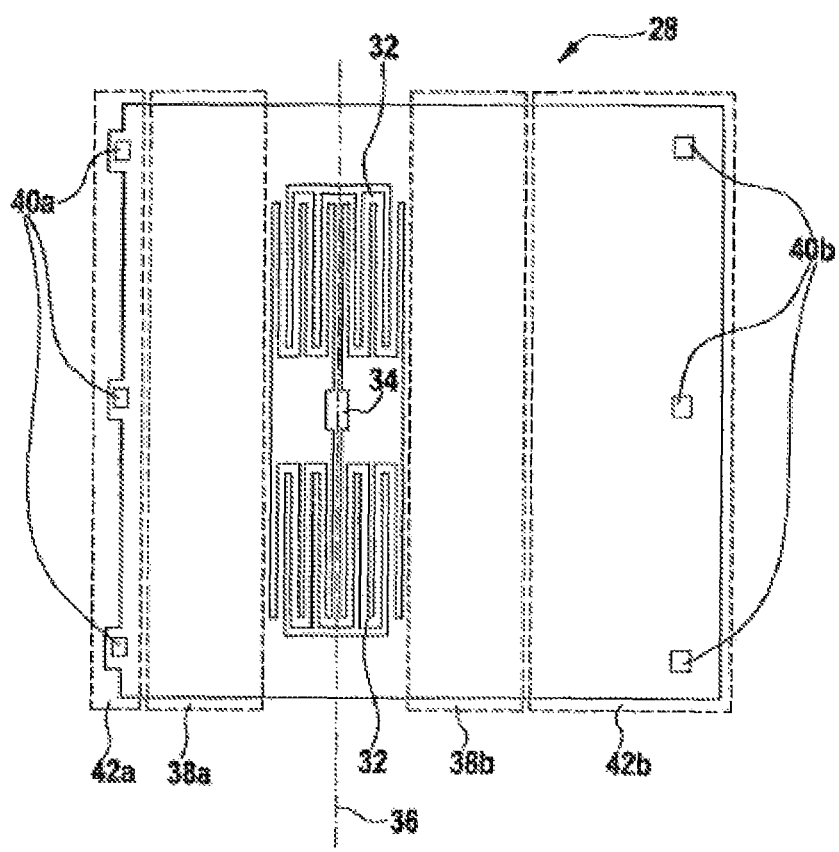
Figure 2:
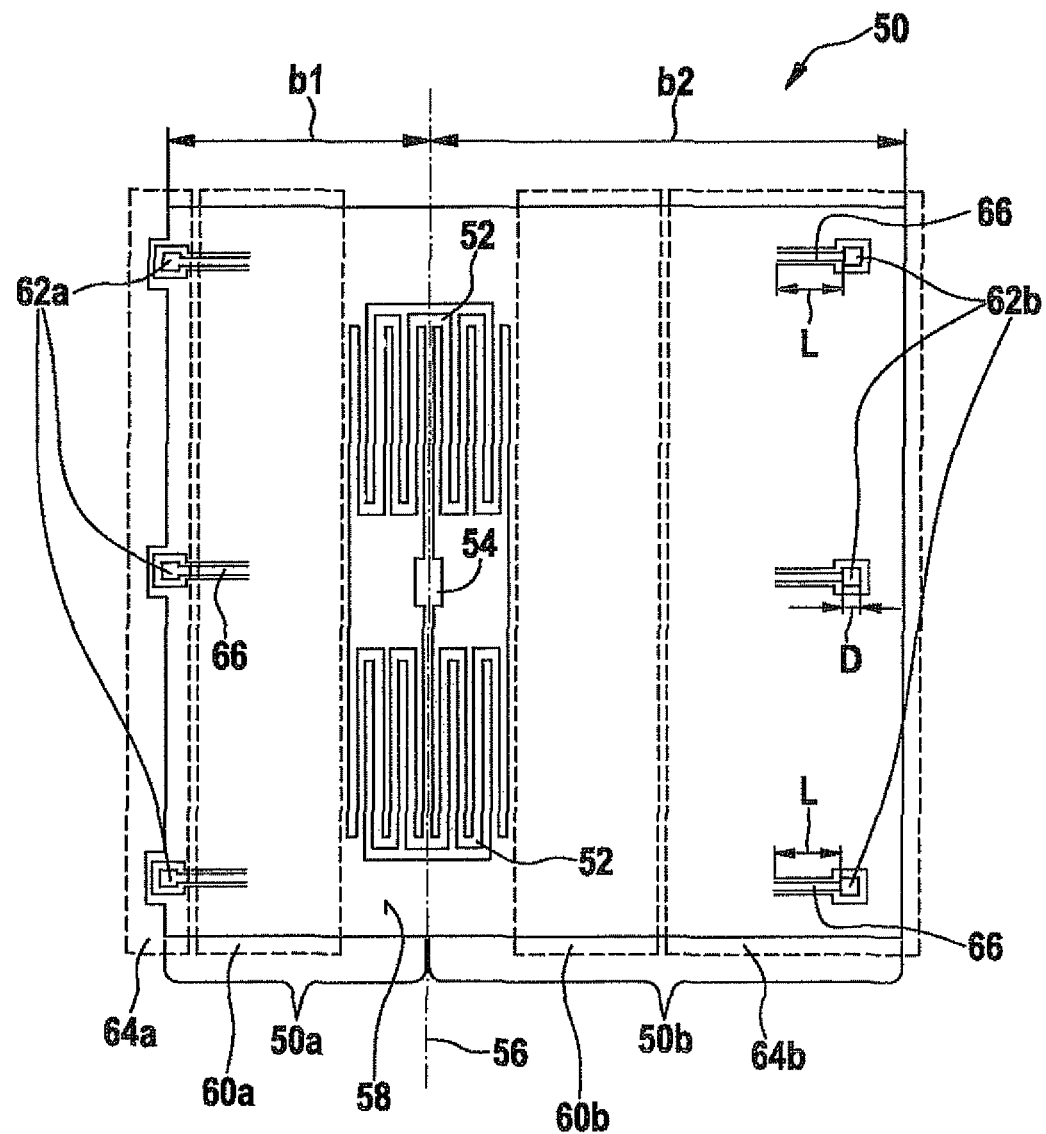
FIG. 2 shows a top view of a lower side of a seismic mass of a sensor device according to an example embodiment of the present invention.

FIG. 2 shows a top view of a lower side of a seismic mass of a sensor device according to an example embodiment of the present invention.

Seismic mass 50, fashioned as a rocker, is fastened to a base plate of the sensor device via flexible springs 52 and an anchor 54. The base plate can be a subunit of a housing of the sensor device. However, it should be appreciated that the subject matter hereof is not limited to a seismic mass 50 situated in an airtight housing.

Flexible springs 52 and anchor 54 can be fashioned in one piece with seismic mass 50. For example, at least the four flexible springs 52, anchor 54, and seismic mass 50 are structured out from a single micromechanical functional layer. However, here it is to be noted that the sensor device described here is not limited to a particular number or configuration of flexible springs 52 and/or of the at least one anchor 54.

Between anchor 54 and the base plate, it is possible to additionally situate at least one intermediate layer, for example remaining areas of an insulating layer and/or of a metallic and/or semiconductor layer. Seismic mass 50 has a lower side 58, oriented toward the base plate, and an upper side. Seismic mass 50 is shaped such that a height between the upper side and lower side 58 is significantly smaller than a maximum extension of the upper side and/or lower side 58. This can also be described as a planar construction of seismic mass 50.

Seismic mass 50, fashioned as a rocker, has an anti-symmetrical mass distribution relative to an axis of rotation 56. Axis of rotation 56 divides seismic mass 50 into a first partial mass 50a and a second partial mass 50b that is heavier than first partial mass 50a. For example, first partial mass 50a has a first average width b1 perpendicular to axis of rotation 56 that is smaller than a second average width b2 of second partial mass 50b, oriented perpendicular to axis of rotation 56. As an alternative, or in addition thereto, the anti-symmetrical mass distribution of seismic mass 50 can also be realized through an additional coating of second partial mass 50b in comparison with first partial mass 50a.

In an initial position of seismic mass 50, lower side 58 is preferably oriented parallel to the base plate. In the depicted example embodiment, seismic mass 50 is, in its initial position, situated parallel to the xy plane. If the base plate experiences an acceleration having a component perpendicular to the base plate, seismic mass 50 is displaced, due to its anti-symmetrical mass distribution, in a direction oriented perpendicular to the initial position of lower side 58 and to the base plate. In particular, in the example embodiment shown here, seismic mass 50 will be tilted about an axis of rotation 56. The tilting of seismic mass 50 about axis of rotation 56 takes place with a bending of flexible springs 52.

A first partial surface of first partial mass 50a and a second partial surface of second partial mass 50b, which are situated on lower side 58, act as electrodes of seismic mass 50. Adjacent to the first partial surface, a first detection electrode 60a is situated in stationary fashion relative to the base plate. A second detection electrode 60b is fastened to the base plate adjacent to the second partial surface of second partial mass 50b. The broken lines in FIG. 2 indicate the positions of the two detection electrodes 60a and 60b. The positions of the two detection electrodes 60a and 60b relative to the base plate are not influenced by a tilting of seismic mass 50 about axis of rotation 56.

The first partial surface and first detection electrode 60a form a first capacitor of a detection and evaluation device of the sensor device. A second capacitor of the detection and evaluation device is made up of the second partial surface and second detection electrode 60b. If seismic mass 50 is displaced out of its initial position and about axis of rotation 56 as a result of an acceleration of the base plate, the capacitances of the first and of the second capacitor change. The detection and evaluation device is designed to determine the changes in capacitance of the two capacitors and subsequently to determine, taking into account the changes in capacitance, an item of information relating to the acceleration of the base plate and/or to a force acting on the sensor device. The determined item of information can for example be a magnitude of a component of the acceleration oriented perpendicular to the base plate. Because methods for determining an item of information relating to an acceleration and/or to a force acting on a sensor device on the basis of a change in capacitance are known, the functioning of the detection and evaluation device is not further discussed here.

In order to ensure a reliable determination of the displacement movement of seismic mass 50 relative to the base plate, it is advantageous if the initial position of seismic mass 50 is determined such that the first partial surface has a relatively small first average distance from first detection electrode 60a, and the second partial surface has a similarly small second average distance from second detection electrode 60b. At the same time, it is advantageous if the reset forces of flexible springs 52, which counteract a tilting of seismic mass 50 out of its initial position, are comparatively small in order to ensure a significant displacement movement of the seismic mass about axis of rotation 56 even given a small magnitude of the acceleration.

In particular given small average distances between the partial surfaces and detection electrodes 60a and 60b, and/or given a low bending rigidity of flexible springs 52, there exists the possibility that when tilted about axis of rotation 56 the seismic mass may collide with the base plate or with a component of the sensor device that is stationary relative to the base plate. In order to minimize a contact surface of seismic mass 50 and an impact surface during the collision, it is advantageous to fashion at least one raised stop 62a and 62b on lower side 58. Advantageously, at least one first stop 62a is situated on first partial mass 50a and at least one second stop 62a is situated on second partial mass 50b. In particular, a plurality of stops 62a and 62b may be fastened on at least one partial mass 50a or 50b. If at least three stops 62a or 62b are present on a partial mass 50a or 50b, it is advantageous to choose the distances between two adjacent stops 62a or 62b to be equal. In this manner, a uniform distribution of pressure is ensured when there is an impact against stops 62a or 62b on the base plate and/or on the stationary component of the sensor device. In particular, stops 62a or 62b of a partial mass 50a or 50b can have the same distance from axis of rotation 56. Advantageously, stops 62a and 62b situated on lower side 58 are raised in the z direction.

In the depicted example embodiment, a first stop electrode 64a and a second stop electrode 64b are situated directly or indirectly on the base plate. In FIG. 2, the broken lines indicate the positions of the two stop electrodes 64a and 64b. The positions of stop electrodes 64a and 64b are selected such that when seismic mass 50 is tilted about axis of rotation 56, the at least one first stop 62a can strike against first stop electrode 64a, and the at least one second stop 62b can strike against second stop electrode 64b. Stop electrodes 64a and 64b can be structured out, together with detection electrodes 60a and 60b, from a single semiconductor and/or metallic layer.

When a stop 62a or 62b strikes against a stop electrode 64a or 64b, kinetic energy is converted into deformation energy. In order to prevent stiction of stop 62a or 62b on the associated stop electrode 64a and/or 64b, and in order to prevent particle formation, it is advantageous to connect the at least one stop 62a or 62b of seismic mass 50 to seismic mass 50 via at least one spring 66. This can be designated a resilient construction of stops 62a and 62b raised in the z direction on lower side 58. The resilient construction of stops 62a and 62b ensures that an impact against a stop 62a or 62b does not cause damage to the sensor device.

For example, each of stops 62a and 62b is individually connected to seismic mass 50 via a spring 66. The kinetic energy, converted into deformation energy, causes in this case a reversible bending of the at least one spring 66 via which the at least one colliding stop 62a or 62b is connected to seismic mass 50. When seismic mass 50 moves into its initial position, the reversible bending of spring 66 is also reversed.

The at least one spring 66 and the at least one stop 62a or 62b can likewise be structured out from the micromechanical functional layer. An example embodiment of a suitable manufacturing method for the sensor device described here is described in more detail below. The at least one spring 66 can have a linear shape. Such a spring 66 is easily shaped.

Preferably, a spring 66 can have an overall length L that is larger than a maximum extension D of the area of the associated stop 62a or 62b that is raised relative to lower side 58. In particular, the overall length L can be larger by a factor of at least two than the maximum extension D of the raised area. Advantageously, the overall length L is larger by a factor of at least five than the maximum extension D of the raised area. In this manner, an irreversible deformation and breakage of spring 66 upon impact against the associated stop 62a or 62b can be reliably prevented.

Figure 3:
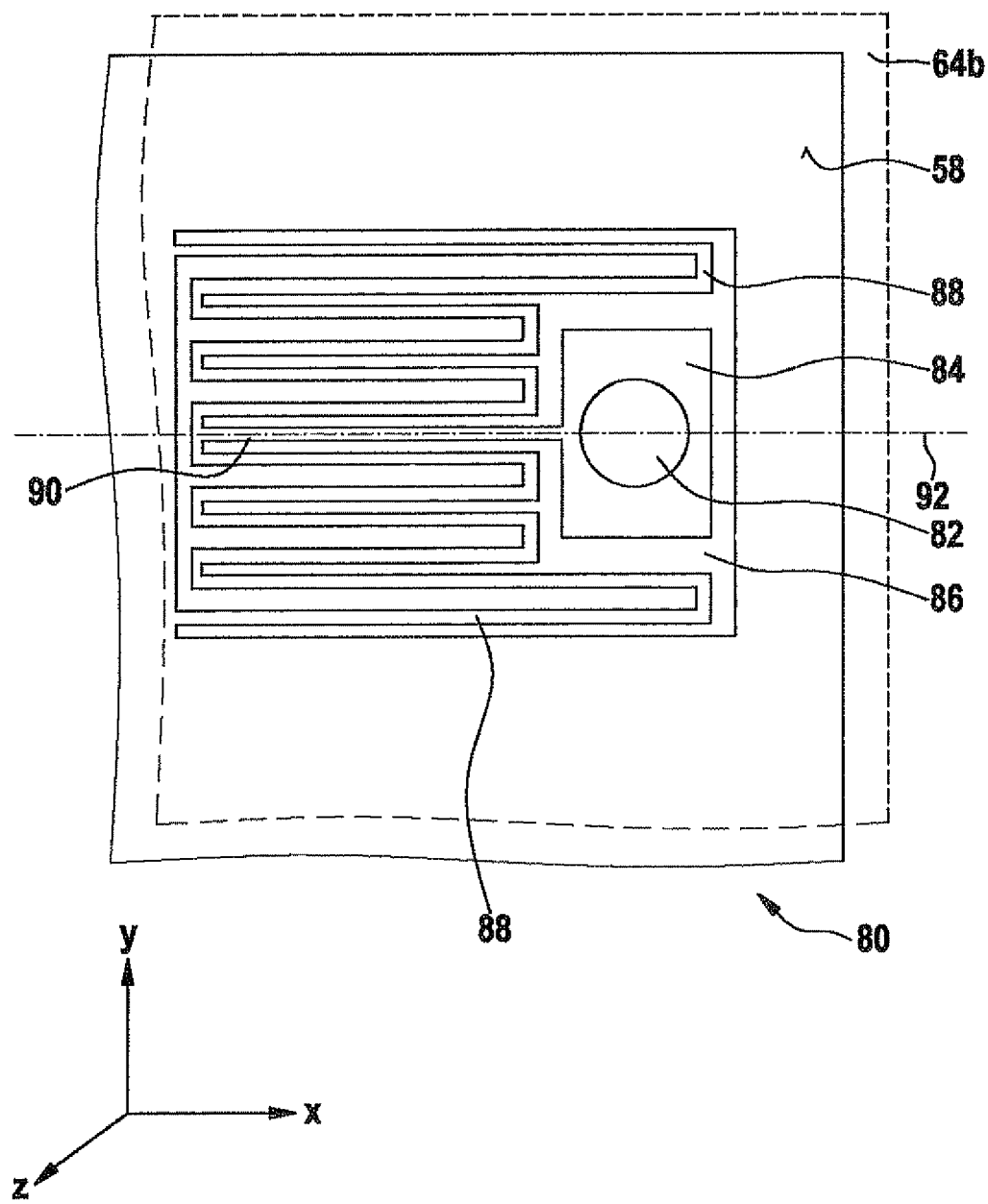
FIG. 3 shows a top view of a partial surface of a lower side of a seismic mass of a sensor device according to an example embodiment of the present invention.

FIG. 3 shows a top view of a partial surface of a lower side of a seismic mass, representing an example embodiment of the sensor device.

Seismic mass 80, shown in a partial top view, is situated in displaceable fashion in a sensor device in the manner described above. The associated sensor device also includes the detection and evaluation device; of the electrodes of the sensor device, only second stop electrode 64b is shown in FIG. 3.

On lower side 58, which in its initial position is oriented parallel to the xy plane, of seismic mass 80, a plurality of stops 82 are situated that are raised in the z direction. Because the situation of stops 82 can be realized in a manner corresponding to that described above, only one of stops 82 is shown in FIG. 3. Stop 82 is fashioned on an outer surface of a resilient area 84, the outer surface of resilient area 84 being situated on lower side 58. In particular, the outer surface of resilient area 84 can lie in one plane with lower side 58 of seismic mass 80.

Resilient area 84 can also be designated an EPI area. Preferably, the resilient area has, in a direction perpendicular to lower side 58, a least layer thickness that is equal to the least layer thickness of seismic mass 80. Stop 82 can be fashioned in one piece with resilient area 84.

In the example embodiment shown here, resilient area 84 is situated in a through-going opening 86 of a displaceable remaining area of seismic mass 80. Resilient area 84 is connected to the displaceable remaining area of seismic mass 80 via two meander-shaped springs 88 and a web element 90. A first end of web element 90 contacts resilient area 84. A second end of web element 90 is situated at each end of a meander-shaped spring 88. The two other ends of meander-shape springs 88 are fastened to the displaceable remaining area of seismic mass 80. Resilient area 84, web element 90, the two meander-shaped springs 88, and seismic mass 80 can be structured out from a single micromechanical functional layer as a one-piece unit.

The shape of meander-shaped springs 88 provides an advantageous overall length of meander-shaped springs 88 that can be compressed into a comparatively small space. Due to the advantageously large overall length of meander-shaped springs 88, the kinetic energy that is converted into bending energy when there is an impact against stop 82 is distributed via meander-shaped springs 88 without causing an irreversible deformation and/or breakage of meander-shaped springs 88.

Preferably, in their initial positions the two meander-shaped springs 88 are fashioned symmetrically to an axis of symmetry 92 that is oriented parallel to the xy plane. Axis of symmetry 92 can extend centrically through stop 82. In this manner, it is ensured that when there is an impact against stop 82 the kinetic energy converted into bending energy is uniformly distributed to the two meander-shaped springs. The symmetrical formation of at least two springs via which a stop 82 is connected to a seismic mass 80 is not limited to meander-shaped springs 88.

Figure 4:
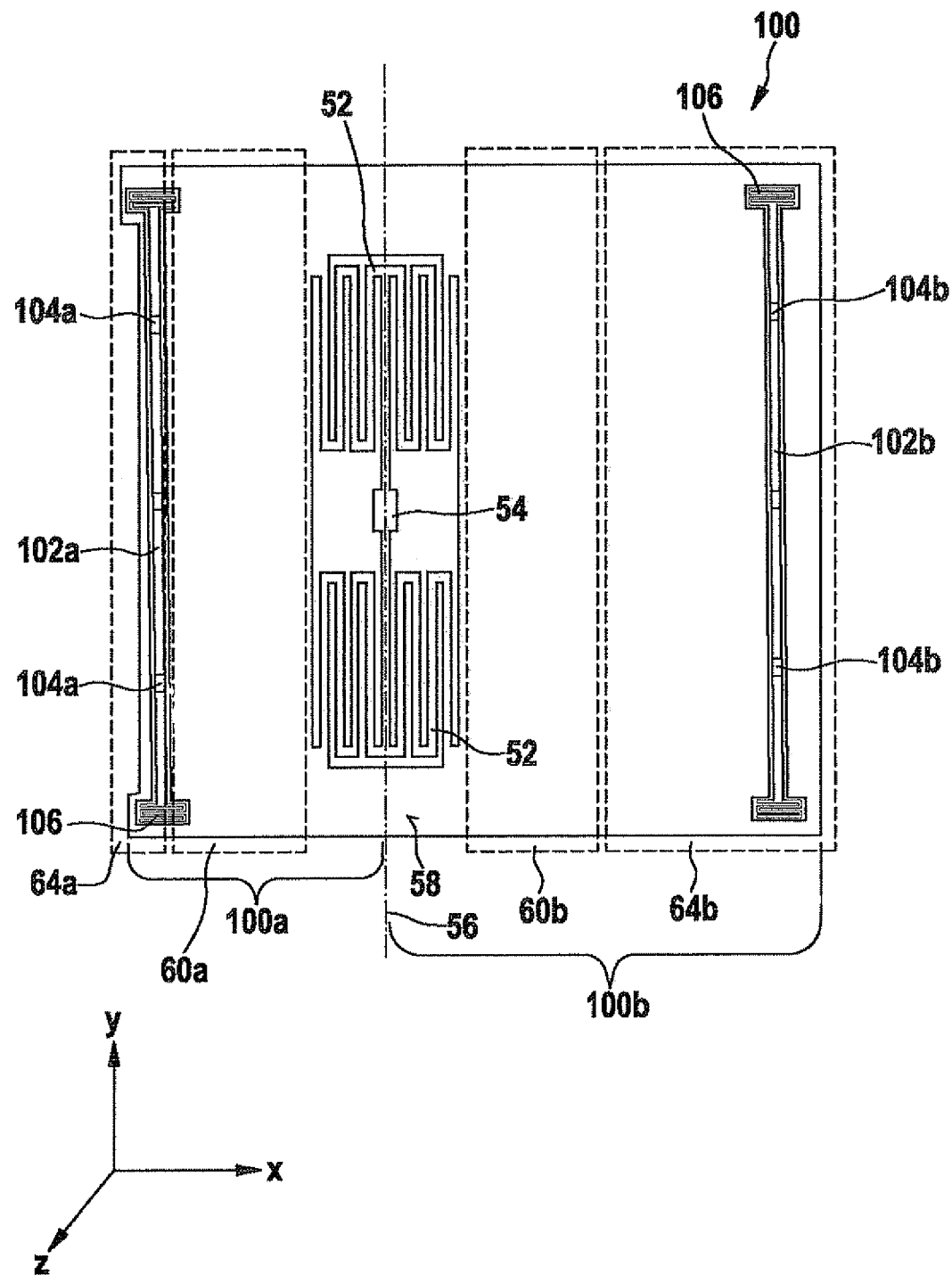
FIG. 4 shows a top view of a lower side of a seismic mass of a sensor device according to an example embodiment of the present invention.

FIG. 4 shows a top view of a lower side of a seismic mass, representing an example embodiment of the sensor device.

The sensor device of depicted seismic mass 100 includes the already-described components 52, 54, 60a, 60b, 64a, and 64b; the functioning of these components is not described again here. Differing from the first-described example embodiment, the example embodiment depicted here of the sensor device has a seismic mass 100 having two partial masses 100a and 100b, whose displaceable remaining areas each enclose a resilient area 102a or 102b. Preferably, resilient areas 102a and 102b have a least layer thickness extending perpendicular to lower side 58 (in the z direction) that is equal to a least layer thickness of seismic mass 100 (in the z direction).

At least two stops 104a and 104b that are raised in the z direction are fashioned on resilient areas 102a and 102b. Here it is to be noted that the description of a particular number or configuration of stops 104a or 104b on a resilient area 102a or 102b should not be considered to be limiting. Preferably, stops 104a or 104b are situated on a resilient area 102a or 102b such that the distances between two adjacent stops 104a or 104b are equal.

Resilient areas 102a and 102b are each connected to seismic mass 100 via at least one spring 106. In the depicted example embodiment, each of the two resilient areas 102a and 102b is coupled to seismic mass 100 via two springs 106. However, the example embodiment described here is not limited to a particular number of springs 106 per resilient area 102a or 102b, or to the depicted configuration of springs 106.

The number of springs 106 is capable of being reduced through the formation of a plurality of stops 104a and 104b on a resilient area 102a or 102b. In addition, this increases the mass that is displaced when there are impacts against stops 104a and 104b, and thus provides better damping.

The sensor devices described in the foregoing paragraphs can be equipped with soft flexible springs. In this manner, the sensor devices are also suitable for detecting and/or measuring small accelerations and/or comparatively small forces in a direction perpendicular to the initial position of the upper side and/or of lower side 58. In particular for an acceleration sensor fashioned as a low-g sensor, the above-described resilient constructions of the stops are very advantageous.

Figure 5:
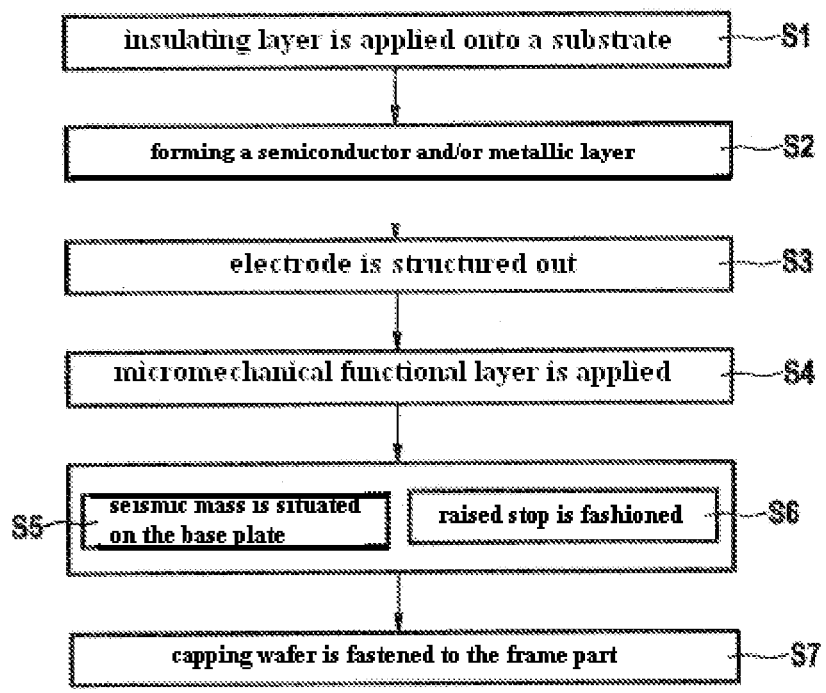
FIG. 5 shows a flow diagram of a method for manufacturing a sensor device according to an example embodiment of the present invention.

FIG. 5 shows a flow diagram representing an example embodiment of the method for manufacturing a sensor device. For example, the manufacturing method can be used to manufacture the sensor devices described above.

In a step S1, an insulating layer is applied onto a substrate in such a way that the insulating layer at least partly covers a surface of the substrate. Preferably, the substrate includes silicon. The insulating layer can for example be an oxide layer.

Subsequently, a semiconductor and/or metallic layer that at least partly covers the insulating layer is formed (step S2). In a step S3, at least one electrode can be structured out from the semiconductor and/or metallic layer as a subunit of a detection and evaluation device. For example, recesses are etched into the second semiconductor and/or metallic layer that define the later structure of the at least one electrode. The at least one electrode can be a detection electrode and/or a stop electrode.

In example embodiments, step S3 is carried out before an application of a micromechanical functional layer onto at least partial areas of the semiconductor and/or metallic layer in a step S4. However, the manufacturing method described here is not limited to such a sequence for carrying out steps S3 and S4. Before step S4, the recesses etched into the second semiconductor and/or metallic layer are filled with a filling material, for example with an oxide. Preferably, the micromechanical functional layer includes silicon. In this manner, a layer sequence is obtained made up of the substrate, the insulating layer, the semiconductor and/or metallic layer, and the micromechanical functional layer.

In a step S5, a planarly fashioned seismic mass having an upper side and a lower side is situated on the base plate of the later sensor device such that during operation of the sensor device, when there is an acceleration of the base plate, the seismic mass is displaced relative to the base plate in a direction that is not parallel to an initial position of the upper side and/or of the lower side. Simultaneously, previously, or subsequently, in a step S6 at least one raised stop is fashioned on the upper side and/or on the lower side of the seismic mass. Here the at least one stop is connected to the seismic mass via at least one spring.

Steps S5 and S6 can be carried out simultaneously by structuring out at least the seismic mass, the at least one stop, and the at least one spring from the micromechanical functional layer. In addition, in an etching method for carrying out steps S5 and S6, at least one partial component of an anchor via which the seismic mass is connected to the base plate or to a subunit of the later housing of the sensor device, at least one flexible spring situated between the anchor and the seismic mass, and a frame part enclosing the seismic mass can be structured out from the micromechanical functional layer. Here the at least one flexible spring can be shaped such that during operation of the finished sensor device it has a slight bending rigidity for the detection of small accelerations and/or small forces.

Before the etching method, a lithography method can be used to form a structured etching mask on the micromechanical functional layer. The etching method used can be a two-stage etching method. In a first stage of the etching method, etching can preferably take place in an etching direction oriented perpendicular to the micromechanical functional layer. Subsequently, spacers can be formed from a material that is not attacked in the second stage of the etching method, said spacers covering only the side walls of the trenches etched in the first stage of the etching method. Thus, in the second stage of the etching method an undercutting takes place of the structures structured out in the first stage. Because the etching method should be understood based on the foregoing, it is not described in more detail here.

In at least one further step, the detection and evaluation device can be finished, the device being designed to acquire, during operation of the sensor device, a displacement movement of the seismic mass out of the initial position relative to the base plate and, taking into account the displacement movement, to determine an item of information relating to the acceleration of the sensor device and/or relating to a force acting on the sensor device.

In a further step S7, a capping wafer can be fastened to the frame part. For example, the capping wafer is a glass wafer into which at least one recess has been structured. This recess ensures good mobility of the seismic mass during operation of the finished sensor device.

The fastening of the capping wafer to the frame part can take place via a bonding method. Preferably, here an inner volume is hermetically sealed to the seismic mass. In this manner, the penetration of particles or liquids into inner volume 20 can be reliably prevented.

The method steps described in the foregoing paragraphs can be carried out in bulk. In this manner, a large number of seismic masses, electrodes, and capping wafers can be manufactured simultaneously. Subsequently, a separation of the finished sensor devices is carried out by milling, etching, and/or sawing.

What is claimed is:

1. A sensor device, comprising:
   a base plate;
   a seismic mass fastened to the base plate via at least one spring and having an upper side and a lower side that is situated on the base plate such that given an acceleration of the base plate the seismic mass is capable of being displaced relative to the base plate in a direction that is oriented non-parallel to an initial position of at least one of (a) the upper side and (b) the lower side of the seismic mass;
   at least one raised stop on at least one of (a) the upper side and (b) the lower side of the seismic mass; and
   a detection and evaluation device that is adapted to acquire a displacement movement of the seismic mass relative to the base plate, and, taking into account the displacement movement, to determine an item of information relating to at least one of (a) an acceleration of the sensor device and (b) a force acting on the sensor device;
   wherein the seismic mass has at least one resilient area that includes the at least one stop and has at least one displaceable remaining area, the resilient area being connected to the remaining area via at least one further spring.

2. The sensor device according to claim 1, wherein the seismic mass is capable of rotation relative to the base plate about an axis of rotation.

3. The sensor device according to claim 2, wherein the seismic mass is fashioned as a rocker having a mass distribution that is anti-symmetrical relative to the axis of rotation.

4. The sensor device according to claim 1, wherein the at least one further spring via which the at least one stop is connected to the seismic mass is at least one of (a) U-shaped, (b) V-shaped, (c) linear, and (d) meander-shaped.

5. The sensor device according to claim 1, wherein the at least one stop is connected to the seismic mass via at least two further springs that are fashioned symmetrically to an axis of symmetry that extends parallel to at least one of (a) the upper side and (b) the lower side.

6. The sensor device according to claim 1, wherein at least two raised stops are situated on an outer surface, situated on at least one of (a) the upper side and (b) the lower side of the seismic mass, of the resilient area.

7. The sensor device according to claim 1, wherein the sensor devices is arranged as an acceleration sensor.

8. The sensor device according to claim 1, wherein the sensor device is arranged as a rotational rate sensor.

* * * * *